Figures 1, 2:
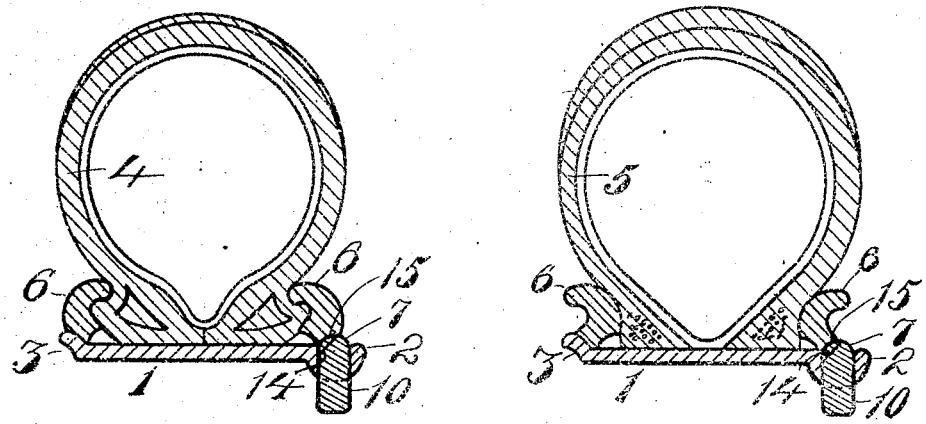

No. 814,088. PATENTED MAR. 6, 1906.
F. A. SEIBERLING.
VEHICLE WHEEL.
APPLICATION FILED JULY 29, 1905.

2 SHEETS—SHEET 1.

Witnesses:
A. E. Kling
Glenara Fox

Inventor:
F. A. Seiberling
by C. E. Humphrey
Atty.

No. 814,088. PATENTED MAR. 6, 1906.
F. A. SEIBERLING.
VEHICLE WHEEL.
APPLICATION FILED JULY 29, 1905.
2 SHEETS—SHEET 2.
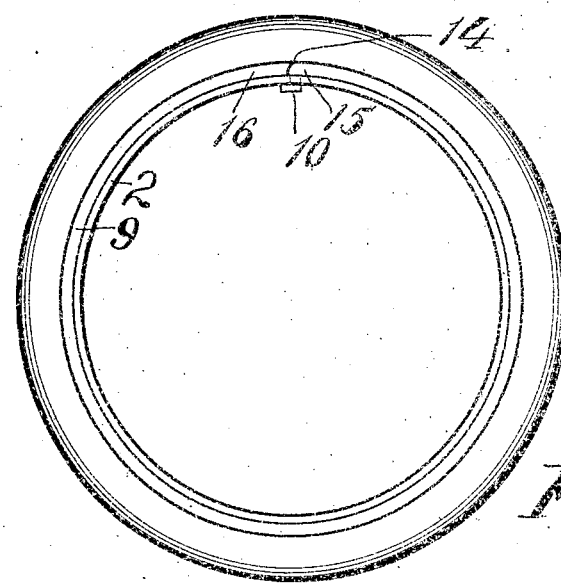
Fig. 4.
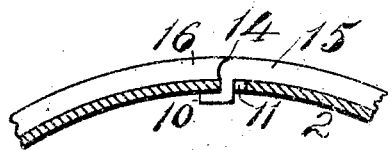
Fig. 5.
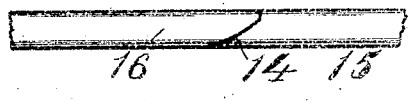
Fig. 6.
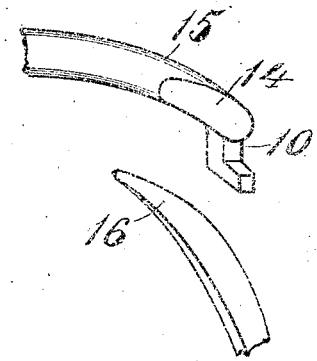
Fig. 7.
Fig. 8.
Witnesses:
A. E. Kling
Glenara Fox
Inventor:
F. A. Seiberling
by C. E. Humphrey,
Atty.

UNITED STATES PATENT OFFICE.

FRANK A. SEIBERLING, OF AKRON, OHIO.

VEHICLE-WHEEL.

No. 814,088.

Specification of Letters Patent.

Patented March 6, 1906.

Application filed July 29, 1905. Serial No. 271,837.

*To all whom it may concern:*

Be it known that I, FRANK A. SEIBERLING, a citizen of the United States, residing at Akron, in the county of Summit and State of Ohio, have invented new and useful Improvements in Vehicle-Wheels, of which the following is a specification.

This invention relates to vehicle-wheels provided with pneumatic, solid, or cushion tires of elastic material, more particularly pneumatic tires of the double-tube type having contractible, inextensible, or semi-inextensible bands or edges; and the object thereof is to so construct the wheel as to enable the tire to be readily applied thereto, to be securely locked in position thereon, and easily removed when desired.

The objects of this invention are to provide a new and improved rim for the wheel upon which the tire is to be mounted provided with means for suitably seating tire-retaining devices thereon and to further provide a novel tire-retaining device capable of coöperating with said rim.

The invention further aims to construct the tire-retaining means so that when in position it will be locked against circumferential motion and will be further securely held from sidewise displacement by the tire itself.

The invention contemplates providing a device for retaining tires on a rim involving a spilt annularly-formed member having its ends preferably arranged to be suitably held in proper position with respect to each other when the tire is on the rim and to provide said tire-retaining device with means to interlock with said rim, whereby it is retained securely against circumferential motion. The invention further contemplates the constructing of this device so that it will be equally applicable to those forms of retaining devices which engage the tire directly as well as to those retaining devices which are used as an auxiliary device for locking a tire-retaining means on the rim.

The invention consists, essentially, in constructing a rim for vehicle-wheels adapted to receive a suitable tire having along one or both of its side edges a circumferential seat and in further providing said seat with a split annular member either inherently capable of retaining a tire on the rim or else so constructed that it will act as a locking means for a tire-retaining member, one end of said split annular member being arranged to be securely locked to said rim and the other so shaped and disposed with respect to the locked end that the two will coöperate and the annular member be securely held in its seat, further aided by the tire on the rim.

With the foregoing and other objects in view the invention consists of the novel construction, combination, and arrangement of parts constituting the device to be hereinafter referred to and illustrated in the accompanying drawings, which form a part of this specification, in which is shown the preferred embodiment of the invention; but it is to be understood that changes, variations, and modifications can be resorted to which come within the scope of the claims hereunto appended.

Figure 3:
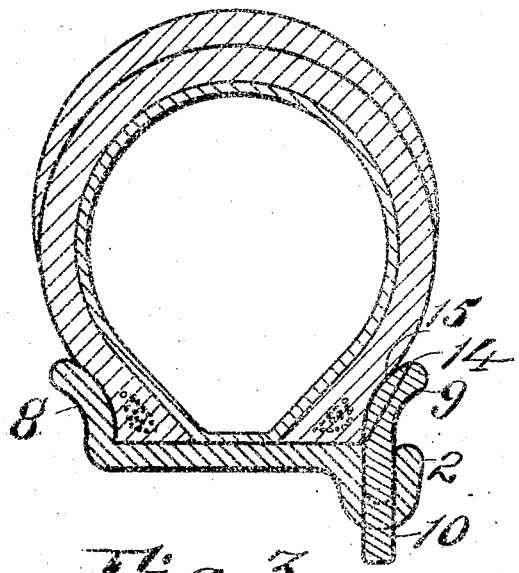

In the drawings, wherein like reference characters denote corresponding parts throughout the several views, Figure 1 is a cross-section of a rim and tire portion of a wheel constructed in accordance with this invention, also showing in cross-section the retaining means for securing the tire, said retaining means arranged in operative relation with respect to that form of tire known as the "clencher" type. Fig. 2 is a like view showing the arrangement of the retaining means in operative relation with respect to another form of tire. Fig. 3 is a similar view to Fig. 2, showing the tire-retaining means in cross-section and in operative relation with respect to the tire. Fig. 4 is a side elevation of a wheel rim and tire with my improved retaining means shown in Fig. 3 in position. Fig. 5 is a side elevation of my improved retaining means with the seat therefor in longitudinal section. Fig. 6 is a plan view of the device shown in Fig. 5. Fig. 7 is a perspective view of the abutting ends of my improved retaining device in perspective, and Fig. 8 is a view similar to Fig. 5 of a slight modification of the device shown therein.

Referring to Figs. 1 and 2 of the drawings, 1 denotes a flat rim having one side formed with an endless offset 2 of a cross-sectional configuration suitable to receive a tire-retaining device and forming a seat for that purpose. This offset 2 is on the level or depends below the face of the inner rim. In the construction shown in Fig. 1 the opposite side of the rim has an upwardly-extending endless inclined curvilinear flange 3, forming an abutment for the purpose hereinafter set forth.

The retaining means for the tire, whether it be used for the form of tire shown in Fig. 1, which is indicated by the reference character 4, or whether it be used for the form of tire shown in Fig. 2, which is represented by the reference character 5, consists of a pair of endless tire-retaining devices and a split locking device. Each of the tire-retaining devices shown in these figures is removable, as well as reversible, and these devices are also interchangeable. When the said devices are in one position, they act as tire-holders and in the other position they act as clamps. The retaining devices are indicated by the reference characters 6. Each of these devices is formed with a plurality of bearing-surfaces, preferably curvilinear in contour and shown thus in the drawings, although these bearing-surfaces may be of other configuration with equal efficacy as far as retaining the tire in position is concerned.

The locking device consists of a split ring (indicated by the reference character 7) and may be of various forms, but should have one or two bearing-surfaces conforming in contour to the shape of the retaining devices 6.

In assembling a wheel for use in connection with the tire 4 one of the bearing-faces of one of the retaining devices 6 bears against the flange 3 and the corresponding bearing-face of the other retaining device bears against the ring 7, which is mounted within the offset 2. The inturned hooked portions of the retaining devices 6 engage the base portion of the tire and serve to retain it in proper position upon the rim. When the tire 4 is inflated, the pressure is against the hooked portions of the retaining devices 6, which causes the retaining devices 6 to securely retain themselves against the flange 3 and the locking-ring 7. At the same time the retaining device, which is arranged in operative relation with respect to the ring 7, is securely locked by this ring in position.

It will be stated that the retaining devices are set up in operative relation before the ring 7 is seated in the offset. After the retaining devices are in position the ring 7 is sprung into the offset or its seat, consequently forming what may be termed a "locking means" for a tire-retaining device. Although the ring or locking device 7 is intended to keep that portion of the device which is engaged by the locking device from slipping off the rim, the retaining device itself automatically locks the locking device in its seat when the tire is in position on the rim either inflated or deflated.

In the arrangement shown in Figs. 1 and 2 the locking device cannot be taken out of its seat without first deflating the tire and then moving the endless retaining device which ordinarily engages the locking device toward the center of the rim, and then the locking device can be readily detached by springing it out of its seat.

When setting up a wheel using the form of tire shown in Fig. 2, the retaining devices are reversed in position and the bearing-surfaces are also reversed, causing the opposite bearing-surfaces to engage the annular flange 3 and the locking device 7, and the opposite portions of the retaining devices will support the tire, and the base portion of the tire bears sidewise against the retaining devices as contradistinguished from being hooked in position with respect to the type of tire illustrated in Fig. 1. The action of the retaining device in this arrangement secures or holds the tire on the rim, and the action of the bearing-surfaces upon the locking device is the same as that shown in Fig. 1.

In the construction shown in Fig. 3 a modified form of rim is shown. This rim is the same as that shown in Figs. 1 and 2, with the exception that one side of the rim terminates in an upwardly-extending abutment 8, arranged to engage the tire directly, and the tire is held in position on the opposite side by a combined retaining and locking device, (indicated by the reference character 9.) This retaining device 9 is the same in construction as the locking device 7, (shown in Figs. 1 and 2,) with this exception that this one extends upwardly from the offset a greater distance than those heretofore described and its inner portion is arranged to engage the side of the base portion of the tire itself instead of engaging the retaining device and serve as a locking device.

The description heretofore given has had especial relation to the manner in which the locking devices 7 and 9 retain the tire, and the general construction of the retaining devices 7 and 9 will now be described. The locking or retaining devices 7 and 9 will be substantially the same in construction as has been already stated, excepting that those constructed in accordance with Fig. 3 will be extended upwardly and curved to engage directly the sides of the tire; otherwise their construction will be substantially identical with the forms shown in Figs. 1 and 2. These retaining devices 7 and 9 consist of a split ring adapted in contour to seat in the offset 2 of the rim. This split or severance of the ring (denoted in the drawings by the numeral 14) will be preferably on a line oblique to the longitudinal line of the annular portion thereof and also inclined with respect to a line drawn vertically through the body thereof, so as to produce a cut substantially equivalent to that shown in Fig. 7. The ends of the retaining devices 7 and 9 (indicated in the drawings by the reference-numerals 15 and 16) being cut obliquely are adapted when placed within the seat in the offset 2 to nicely abut against one another and form when so placed a continuous ring having an uninterrupted exterior. Preferably at or near the end 15 of the devices 7 or 9 is a downwardly-extending hook-shaped element 10, preferably in the form of an L. This L-shaped element 10 is arranged to be passed through an opening 11, formed in the bottom of the groove or seat in the offset 2. This opening 11 is of sufficient length to permit the insertion of the hook-shaped element 10 when tilted to a slight degree, and then to lock the same in the position shown in Fig. 5. As soon as the member 10 is firmly locked in the opening 11 in the bottom of the seat existing in the offset 2 the balance of the member 7 or 9 is sprung into the seat in the offset 2 and their ends 15 and 16 will abut against each other and will be in such relation with respect to each other as to form a continuous uninterrupted ring, the scarfing or chamfering of the adjacent ends 15 and 16 of the ring being such as to cause an even and perfect joint between them. In scarfing or chamfering these ends it will be so done that the line of junction of the adjacent ends of the ring will cause the end 15, which bears the L-shaped element 10, to be on the outside or separated by the oppositely-disposed end 16 from either the tire itself or the tire-retaining means. By this is meant that the free or loose end 16 (the one not bearing the L-shaped element) will be interposed when in proper position between the tire or the tire-retaining means and the oppositely-disposed end 15, which bears the L-shaped element 10. This cut or severance 14 of the ring 7 or 9 is such that the lateral pressure exerted by the tire, either upon the retaining device 9 or the pressure exerted by the tire-retaining rings 6 upon the locking device 7, will cause the free or inner end of the split member 7 or 9 to be pressed more firmly against the other in direct ratio with the pressure exerted by the tire. It will be obvious that the locking of the L-shaped member 10 through the opening or slot 11 in the bottom of the seat in the offset 2 of the rim will absolutely prevent circumferential motion of the members 7 and 9 whether used in the form indicated in Figs. 1 and 2 or in the form shown in Fig. 3, and the greater the lateral pressure exerted by the tire the closer will be the adherence of the ends of the severed ring to each other.

In Fig. 8, which is a slight modification of the forms already described, the end of the split member 7 or 9 which bears the depending L-shaped element 10 is provided with a forwardly-extending integral lug 12, and the opposite or free end of this member is provided with a suitable notch to receive the projecting lug 12 and is further provided with a lower projecting lug 13, which passes under the lug 12 and serves to aid in the engagement of the abutting ends of this member.

In the form last described the free end of the member 7 or 9 is prevented by the overhanging lug 12 from flying out of place by reason of centrifugal force exerted thereon during the rapid revolution of a wheel-rim on which the same is mounted.

It will be obvious that the abutting ends 15 and 16 of the annular member which is adapted to be mounted in the seat in the offset 2 may be variously constructed, so that they will properly meet and present a smooth and uninterrupted outer surface, and yet so interlock with each other as to be retained securely in position by the lateral pressure exerted by the base portion of the tire. It will be further obvious that the locking element 10, which is arranged to engage the offset 2, may be constructed in other ways than that illustrated herein without in any manner departing from the scope of this invention.

What I claim, and desire to secure by Letters Patent, is—

1. A vehicle-wheel comprising a rim having a seat for a tire and an offset along one of its edges forming a seat, a split ring mounted in said seat and having the severed ends thereof overlapping so as to prevent the said ends from displacement when pressure is applied to the ring, and means carried by the ring and adapted to interlock with the said offset thereby preventing the ring from circumferential motion.

2. A vehicle-wheel comprising a rim having a seat for a tire and an offset along one of its sides forming a seat, a split annular member arranged in said seat, the oppositely-disposed ends of said annular member being arranged to overlap to prevent the displacement thereof when pressure is applied to the ring, means on said annular member arranged to pass through said offset and lock said annular member against circumferential motion therein.

3. A vehicle-wheel comprising a rim to receive a tire and having an offset constituting a seat, said offset provided with an opening, a split annular member arranged in said seat, and having the ends thereof overlapping to prevent displacement of said ends when pressure is applied to the ring, a locking element projecting from said annular member arranged to enter the opening in said offset and prevent the circumferential motion of said annular member.

4. A vehicle-wheel comprising a rim having a seat for a tire and an offset along one of its sides forming a seat, said offset being provided with an opening, a split annular member arranged in said seat and having overlapping ends associating with each other to prevent displacement thereof when pressure is applied to the ring, and a projecting hook-shaped element on said annular member adjacent its severed portion arranged to enter and lock in the opening in said offset.

5. A vehicle-wheel comprising a rim having a seat for a tire and an offset along one of its sides forming a seat, said offset being provided with an opening, a split annular member arranged in said seat and having the ends thereof overlapping, the ends of said split annular member being formed to associate with each other and present when associating with each other an uninterrupted exterior, and a hook-shaped element projecting from said annular member arranged to engage the opening in said offset, whereby said annular member is locked against circumferential motion.

In testimony whereof I have hereunto set my hand in presence of two subscribing witnesses.

FRANK A. SEIBERLING.

Witnesses:
GLENARA FOX,
C. E. HUMPHREY.